United States Patent [19]
Allen

[11] 3,859,835
[45] Jan. 14, 1975

[54] CUT OFF FOR CONTINUOUS SHEET METAL FORMER

[75] Inventor: Jeral D. Allen, Littleton, Colo.

[73] Assignee: Waterite Industries, Inc., Denver, Colo.

[22] Filed: July 27, 1973

[21] Appl. No.: 383,087

[52] U.S. Cl.................. 72/324, 72/332, 83/308, 83/320, 83/638
[51] Int. Cl............................................ B21d 43/28
[58] Field of Search ........ 72/324, 332; 83/196, 198, 83/320, 308, 638, 319

[56] References Cited
UNITED STATES PATENTS

| | | | |
|---|---|---|---|
| 3,391,591 | 7/1968 | Funke | 83/198 |
| 3,442,167 | 5/1969 | Ohmasu | 83/308 |
| 3,656,385 | 4/1972 | Kimbrell | 83/319 |
| 3,704,643 | 12/1972 | Cookson | 83/294 |
| 3,717,058 | 2/1973 | McMinn | 83/320 |

Primary Examiner—C. W. Lanham
Assistant Examiner—James R. Dunzan
Attorney, Agent, or Firm—Richard D. Law

[57] ABSTRACT

For mounting on a continuous sheet metal former, a cut-off die reciprocally mounted at the discharge end of such a former having a die plate for the particular sheet metal form being made, a shear die plate movable at an angle to the perpendicular to shear off a predetermined length of formed metal, and a power cylinder, either air or hydraulic pressure, for actuating the shear plate. The die shear plate has an opening which only approximates the formed sheet metal and does not mate precisely with the die plate openings, but on movement along the die plate, the shear plate initially grabs and holds the formed metal at two points and then progressively shears the formed metal along two shear points to a complete cut-off.

5 Claims, 4 Drawing Figures

3,859,835

CUT OFF FOR CONTINUOUS SHEET METAL FORMER

This invention relates to a flying or traveling cut-off for continuous sheet metal forming machine, permitting the removal of lengths of formed metal without stopping the forming machine. Such forming machines have a series of rollers which shape elongated sheet metal strips into such shapes as gutters, building siding, pipes, etc. The length of the formed metal is limited only by the length of the coil of sheet metal mounted on the machine. The cut-off includes a reciprocable die having spring return means for propelling the die plate back to a position adjacent the discharge end of the metal former after completing the cut-off. A shear plate is mounted in contact with the die plate and moves at an angle across the die plate to shear off a predetermined length of formed metal. The die plate has an opening of the same shape as the formed metal and it is arranged to permit free passage of the formed metal through the die plate. The shear plate has an opening which is of approximately the same shape as the opening in the die plate but is somewhat larger, and as the shear plate moves diagonally across the die plate it grabs the formed metal at two points and holds the formed metal during the cut-off operation. The moving formed metal in turn pulls the cut-off die along with it during the cut-off operation. The shear plate progressively cuts the formed metal at about two opposed points until it severs a length of the formed metal. Tension springs pull the cut-off die assembly back to a point adjacent the forming machine and simultaneously additional springs move the shear plate back to a non-cut-off position in a non-exposed position behind the die plate.

Included among the objects and advantages of the present invention is a travelling cut-off for continuous sheet metal forming machines.

Another object of the invention is to provide an inexpensive and highly effective travelling cut-off for a continuous sheet metal forming machine.

Another object of the invention is to provide a traveling cut-off for a continuous sheet metal former using a shear plate moving at an angle to the die plate of the cut-off.

Still another object of the invention is to provide a traveling cut-off for continuous sheet metal formers using an overhead power cylinder of an air or hydraulic type to acuate a shear plate moving adjacent a die plate.

Yet another object of the invention is to provide a traveling cut-off for a continuous sheet metal former having a spring return for the cut-off mechanism and a spring return for the shear blade, providing position return for both.

A further object of the invention is to provide a simple, hydraulic or air actuator for a shear blade on a traveling cut-off for a continuous sheet metal former without a direct connection between the hydraulic actuator and the shear blade.

These and other objects and advantages of the invention may be readily ascertained by referring to the following description and appended illustrations in which.

Figure 1:
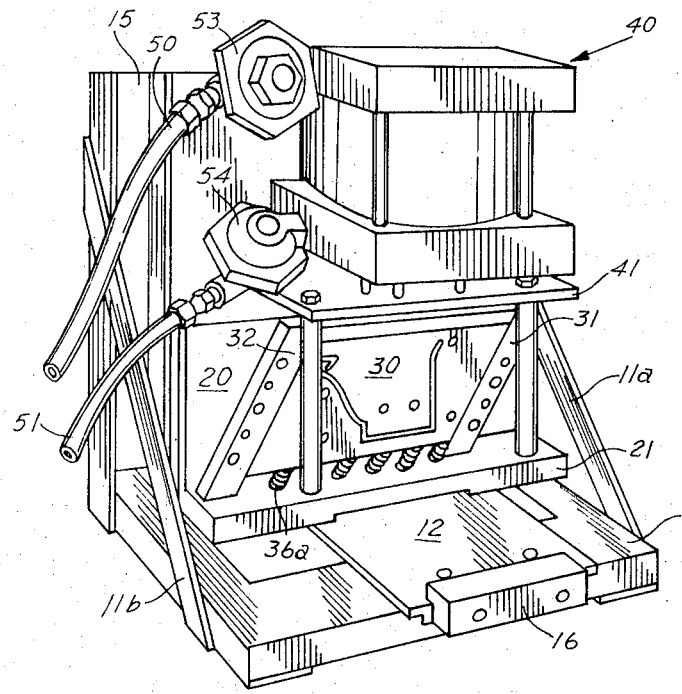
FIG. 1 is a perspective view of a traveling cut-off according to the invention mounted on a continuous sheet metal former arranged to form one type of gutter.
Figure 2:
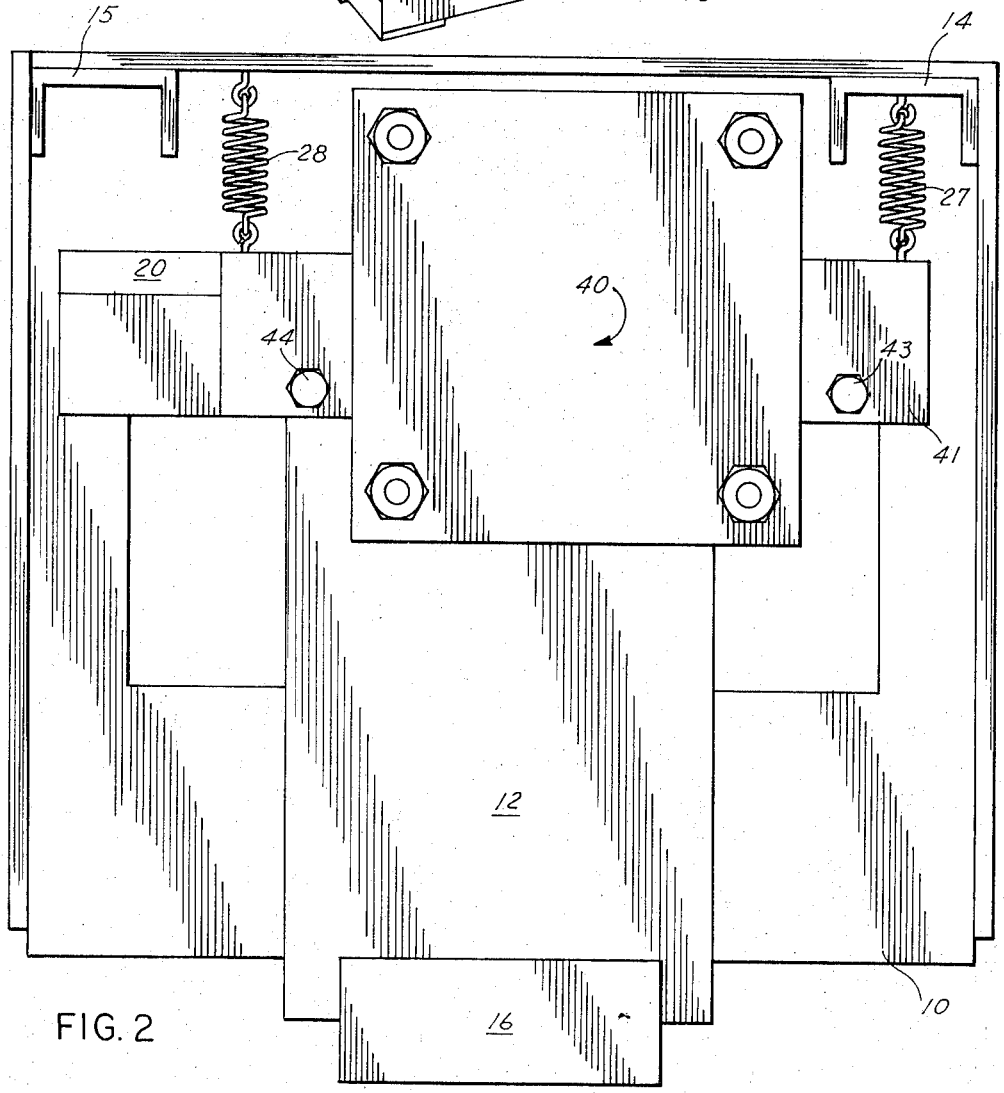
FIG. 2 is a top plan view, generally schematic, of a traveling cut-off for a sheet metal former according to the invention.
Figure 3:
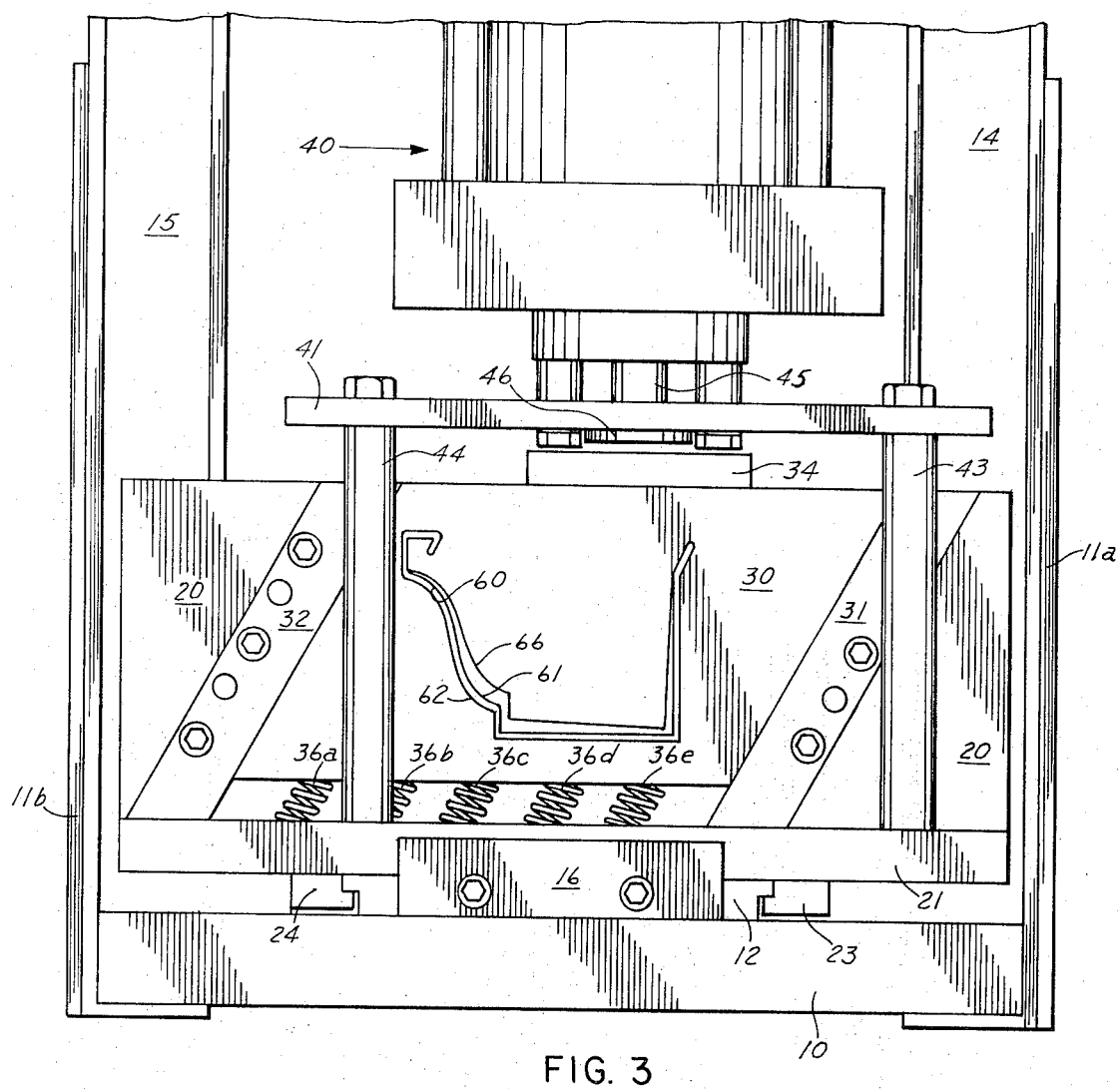
FIG. 3 is a front elevational view of the device of FIG. 2.

The device shown in the illustrations is a traveling cut-off for a continuous gutter forming machine, however, this same traveling cut-off may be used with other sheet metal formers, the main requirement being a change of shape in the opening in the die block as well as the shear plate. Thus, the unit may be adapted for other shapes of gutters, siding, etc.

In the device illustrated in the drawings, a frame base plate 10, arranged to be mounted at the discharge end of a continuous sheet metal former, has a slide plate 12 mounted thereon. The frame base plate is cantilevered from the machine and braces 11a and 11b on opposed sides support the base plate on uprights 14 and 15 which are arranged to be mounted on the frame of the forming machine. A stop block 16 is mounted at the outer end of the slide plate 12 and limits the outer movement of the traveling cut-off on the slide plate.

The traveling cut-off includes a die block 20 mounted on a reciprocal frame 21 which supports the die block 20 in upright position. Lower guide blocks 23 and 24 provide side guides for the reciprocal frame 21. Reciprocally mounted on the forward face of the die plate is a shear plate 30 which is arranged to move at an angle to the die plate on guide blocks 31 and 32 at each side thereof. These blocks are held in position by a series of bolts. The guide blocks 31 and 32 are channeled blocks which permit reciprocal movement of the shear plate and prevents longitudinal movement of the shear plate away from the die block, as is conventional practice and similar to that shown for the guide blocks 23 and 24. A plurality of compression springs 36a, 36b, 36c, 36d and 36e bias the shear plate in an upward position. A pair of tension springs 27 and 28 secured between the rear of the frame member 10 and the slide 21 biases the traveling cut-off toward the discharge end of the sheet metal former.

The shear plate 30 is actuated downwardly by an air cylinder shown in general by numeral 40 which is mounted on a plate 41 held above the shear plate by means of bolts 42 and 43. The air cylinder may be a hydraulic cylinder if desired.

Mounted on the shear blade 30 is a pressure block 34. The block 34 is arranged to move with the reciprocal shear blade 30. The air cylinder 40 includes a piston rod having a bearing pad 46 mounted thereon. The bearing pad 46 is arranged to press against a block 34 pushing the shear blade 30 downwardly at an angle as the block 34 slides across the face of the pressure pad 46. This provides actuation of the shear blade without a direct connection between the two. The compression springs move the plate 30 upwardly when the piston rod is retracted.

The piston 40 is a double acting cylinder and is provided with an inlet line 50 and an outlet line 51, which are provided with pressure regulator valves 53 and 54, respectively. The lines are flexible, to permit movement of the cylinder along with the assembly. The actuation of the cylinder is timed so that a complete stroke of the piston is completed prior to the point where the assembly would strike the stop block. Usually the cut-off is completed after a travel of only a few inches.

Figure 4:
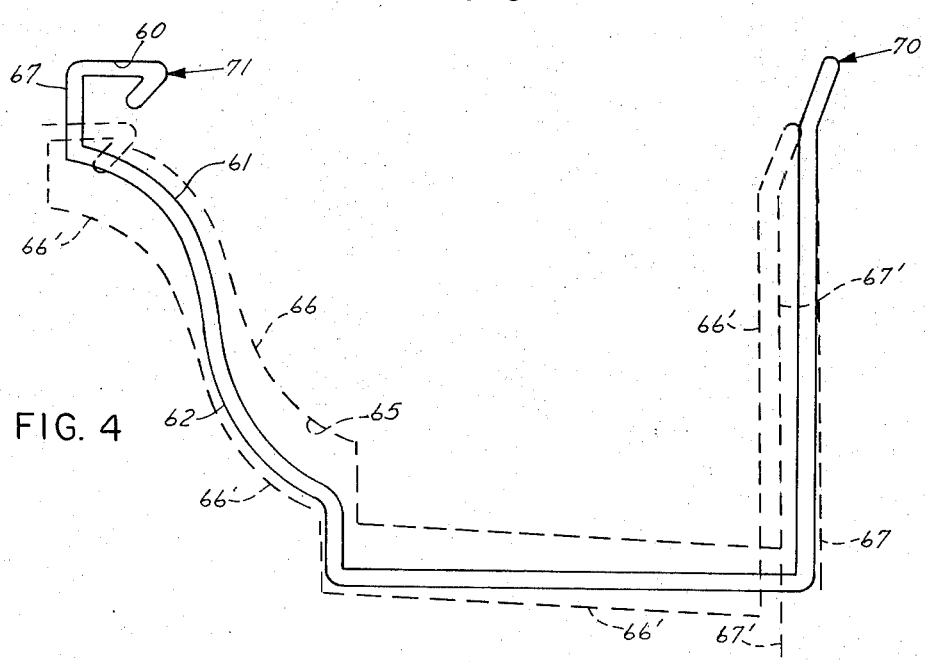
FIG. 4 is a schematic view of a guide plate and shear plate for making a cut-off, according to the invention, in a traveling cut-off die.

The opening through the die plate and the shear plate approximates the shape, in cross-section, of the formed sheet metal from the sheet metal former, and permits free travel of the formed metal through both plates when the cylinder is not actuated. For this purpose the opening 60, FIG. 4, in the die plate is a generally uniform opening of the shape of the formed sheet metal, and it has a uniform slot width which permits free travel of the formed sheet metal through the die plate. The inside edge 61 is approximately the same as the outside edge 62, but spaced therefrom.

The opening 65 of the shear plate, however, has a different configuration for the inside edge 66 of the opening and approximately the same shape of the outside edge 67 of the opening 65. Thus, when the two are in alignment the outside edges 62 of the die plate and 67 of the shear plate coincide, but the inner edge of the opening in the shear plate is spaced from the inner edge of the die plate, making a larger opening in the shear plate. The sheet metal form may move smoothly and freely through the juxtaposed openings. The inside edge 66 of the opening in the shear plate is disposed inwardly of the inside edge 61 of the opening 60 in the die plate when the two are in juxtaposition to permit the sheet metal to pass therethrough. The outside edge 67 of the opening in the shear plate corresponds or mates generally with the outside edge 67 of the opening 60 when the two are in juxtaposition to permit the passing of formed sheet metal therethrough. When the cylinder 40 is actuated the shear plate 30 starts moving on a diagonal path across the die plate (shown by the arrow in FIG. 4). The first movement of the shear plate moves the opening so that points 70 and 71 impinge against the sheet metal, securely holding the sheet metal to the die plate. As the formed sheet metal issues from the former, the die plate is propelled along by the sheet metal. Continued movement of the cylinder continues movement of the shear plate which progressively shears opposite sides of the formed metal to the point where the opening in the shear plate covers the opening in the die plate, and it has passed completely through the sheet metal. In this position the inner edge 66 of the shear plate is in position 66' and the outer edge of the shear plate is in position 67'. The shear plate is relatively thin, and the opening may be sharpened partially on the outside and partially on the inside, or at all points of contact with the formed sheet metal. This provides a cut-off length of the sheet metal. When the last of the metal is sheared, the cylinder retracts the piston rod and the springs 36a, 36b, 36c, 36d and 36e, push the shear plate upwardly permitting the formed metal to pass through the opening in the die plate. The springs 26 and 28 pull the cut-off assembly back against the forming machine. The formed metal continues to pass through the cut-off assembly opening. The configuration of the shear plate opening permits the cutting of the sheet metal at two opposed points rather than shearing the whole metal cross-section at one time, and of course less power is required for the cutting action on the sheet metal.

The length of the cut-off may be automatically set by using a contact switch at a predetermined distance from the cut-off assembly. As the formed metal touches the contact switch, it actuates the cylinder into the cut-off cycle. The switch may be placed to the length desired, and by having a mobile switch the lengths may be varied with the machine continuously operating.

I claim:

1. A traveling cut-off for a continuous thin sheet metal gutter former having a generally squared U-shape, comprising frame means mountable at the existing end of a continuous sheet metal gutter former; a die plate reciprocably mounted on said frame means; means for returning said die plate from a position away from said former to a position adjacent thereto; an opening in said die plate approximating the cross-section of the formed metal sheet and permitting free passage of the formed metal sheet therethrough; a shear plate juxtaposed against said die plate and arranged to move at an angle to the vertical thereacross, there being an opening in said shear plate similar to the shape of the opening in said die plate and of a larger size and off-set from the die plate opening, whereby initial movement of said shear plate clamps and holds the sheet metal and inner edge of the opening in said shear plate is offset for the die plate to provide a progressive shear action on the formed metal sheet; means supporting said shear plate adjacent said die plate and permitting diagonal reciprocable movement therealong; means for returning said shear plate from a lower position to an upper position with the openings in register; a power cylinder, having a piston rod, mounted on said die plate and movable therewith, and said piston arranged to press downwardly on said shear blade; and means for actuating said cylinder.

2. A traveling cut-off according to claim 1 wherein said shear plate includes an upper pressure plate and said piston rod includes a foot arranged to press on and slide across said pressure plate.

3. A traveling cut-off according to claim 1 wherein said means for returning said shear plate includes a series of compression springs under said shear plate mounted at angle to said disc plate and incline with said shear plate for direct bias of said springs on said shear plate.

4. A traveling cut-off according to claim 1 wherein said means for returning said die plate includes tension springs biasing said die plate toward the sheet metal former.

5. A traveling cut-off according to claim 1 wherein said means for supporting said shear plate includes opposed guides mounted on said die plate and arranged at an angle to the vertical whereby said shear plate moves at an angle to the vertical across the opening in said die plate.

* * * * *